US010523614B2

(12) United States Patent
Anderson et al.

(10) Patent No.: US 10,523,614 B2
(45) Date of Patent: Dec. 31, 2019

(54) CONVERSATION AGENT (71) Applicant: Intel Corporation, Santa Clara, CA (US)

(72) Inventors: Glen J. Anderson, Beaverton, OR (US); Margaret Morris, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/968,148

(22) Filed: May 1, 2018

(65) Prior Publication Data

US 2018/0343219 A1 Nov. 29, 2018

Related U.S. Application Data (63) Continuation of application No. 14/560,052, filed on Dec. 4, 2014, now abandoned.

(51) Int. Cl.
H04L 12/58 (2006.01)
(52) U.S. Cl.
CPC .............. H04L 51/16 (2013.01); H04L 51/20 (2013.01); H04L 51/32 (2013.01)
(58) Field of Classification Search
CPC .......... H04L 65/00–65/80; H04L 51/00–51/38
See application file for complete search history.

(56) References Cited

U.S. PATENT DOCUMENTS

| 6,393,460 | B1* | 5/2002 | Gruen | G06Q 10/107 709/204 |
| 6,721,704 | B1* | 4/2004 | Strubbe | G10L 25/48 379/88.01 |
| 8,965,460 | B1* | 2/2015 | Rao | G06F 3/005 455/566 |
| 2007/0130257 | A1* | 6/2007 | Bedi | G06Q 10/107 709/204 |
| 2010/0034363 | A1* | 2/2010 | O'Connell | H04M 1/656 379/88.23 |

(Continued)

FOREIGN PATENT DOCUMENTS

WO WO-2016089594 A2 6/2016

OTHER PUBLICATIONS

"U.S. Appl. No. 14/560,052, Non Final Office Action dated Jan. 31, 2018", 17 pgs.

(Continued)

Primary Examiner — Clayton R Williams
(74) Attorney, Agent, or Firm — Schwegman Lundberg & Woessner, P.A.

(57) ABSTRACT

Various systems and methods for a conversation agent are described herein. A system for a conversation agent includes a context module to determine a context of a conversation involving a first participant and a second participant; a conversation history module to access a conversation history of the first participant and a conversation history of the second participant; a conversation topic module to identify a conversation topic using the context of the conversation, the conversation history of the first participant, and the conversation history of the second participant; and a presentation module to present the conversation topic to the first participant.

16 Claims, 4 Drawing Sheets (56) References Cited

U.S. PATENT DOCUMENTS

| | | |
|---|---|---|
| 2011/0029534 A1* | 2/2011 | Maeda ............... G06F 16/9024 |
| | | 707/738 |
| 2014/0222429 A1 | 8/2014 | Deland |
| 2015/0243083 A1 | 8/2015 | Coggins |
| 2016/0164813 A1 | 6/2016 | Anderson et al. |

OTHER PUBLICATIONS

"U.S. Appl. No. 14/560,052, Non Final Office Action dated Oct. 5, 2017", 11 pgs.

"U.S. Appl. No. 14/560,052, Response filed Sep. 13, 2017 to Restriction Requirement dated Jul. 13, 2017", 7 pgs.

"U.S. Appl. No. 14/560,052, Restriction Requirement dated Jul. 13, 2017", 8 pgs.

"International Application Serial No. PCT/US2015/061095, International Preliminary Report on Patentability dated Mar. 27, 2017", 4 pgs.

"International Application Serial No. PCT/US2015/061095, Written Opinion dated Mar. 10, 2016", 3 pgs.

* cited by examiner

CONVERSATION AGENT

PRIORITY APPLICATION

This application is a continuation of U.S. application Ser. No. 14/560,052, filed Dec. 4, 2014, which is incorporated herein by reference in its entirety.

TECHNICAL FIELD

Embodiments described herein generally relate to user interfaces and in particular, to a conversation agent.

BACKGROUND

Almost everyone has experienced instances when it is difficult to think of a topic for a conversation, or when a conversation lags due to inattention, or other issues that arise during conversations. This is especially difficult for people who have attentional challenges or cognitive impairments. With an aging population, a growing number of people will have some level of cognitive impairment. Conversational assistance may help preserve social and professional relationships for people with attentional or cognitive impairments due to a range of biological and lifestyle factors (e.g., ADHD, sleep deprivation, distraction, stress etc. as well as age related cognitive impairment).

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide a conversation agent for use in conversations. The conversation agent may work with one or more other components to provide a personal agent to a user to assist the user before or during a conversation. The conversation agent may perform various operations, such as reminding the user of a previous conversation before engaging in a current one, maintaining a list of topics discussed during a current conversation, providing relevant or interesting conversation topics based on the context or the participants in the conversation, or alerting the user of a lapse n attention or a missed point of the conversation. Other operations are discussed as well.

Figure 1:
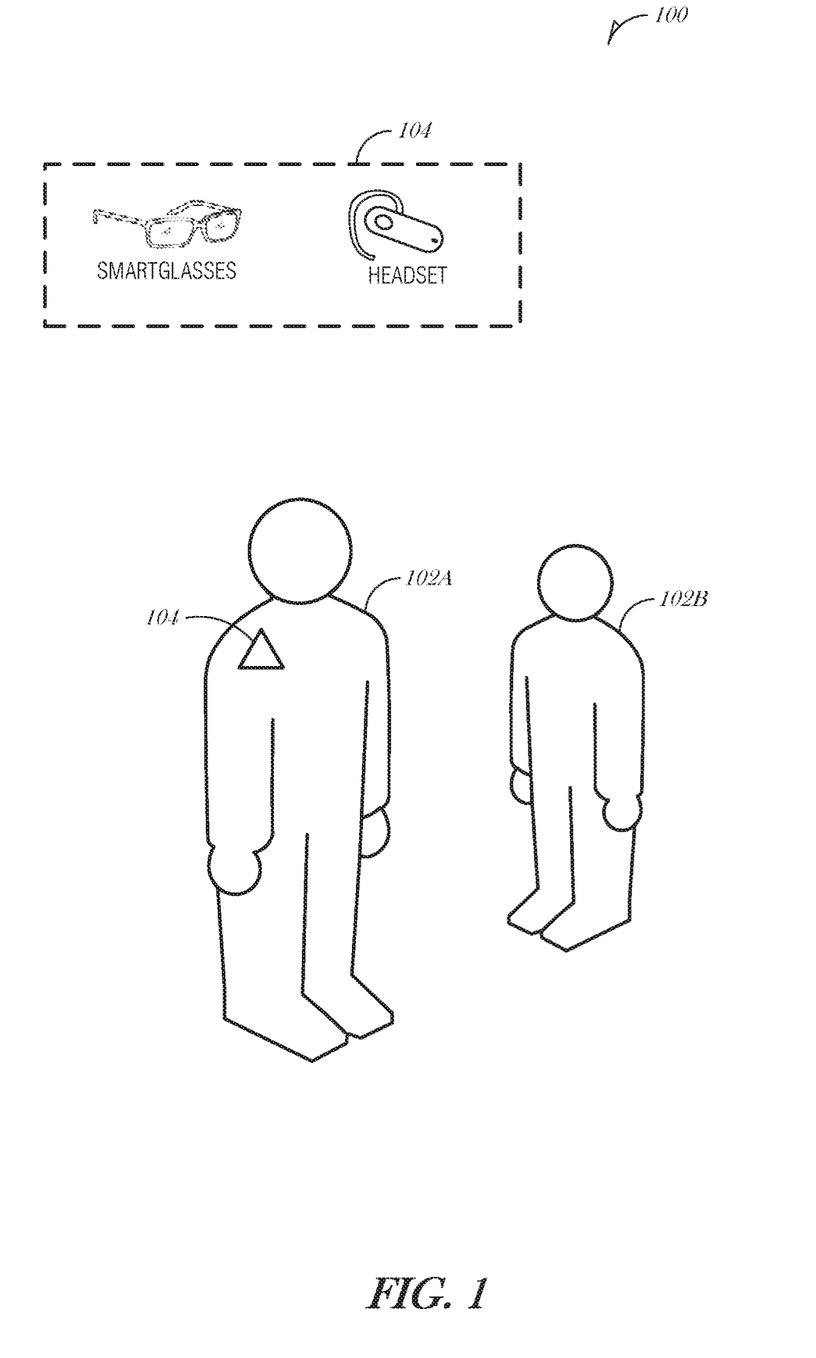
FIG. 1 is a schematic drawing illustrating a conversation environment, according to an embodiment.

FIG. 1 is a schematic drawing illustrating a conversation environment 100, according to an embodiment. The conversation environment 100 includes two participants 102A and 102B. While only two participants are illustrated in this conversation environment 100, it is understood that three or more people may be present and may interact or participate in the conversation. One or both of the participants 102A, 102B may have a conversation agent available for use. The conversation agent may be incorporated into a wearable device 104, such as an earpiece, glasses-based device, headset, or the like. At a minimum, the wearable device 104 includes a microphone to monitor the conversation between the two participants 102A, 102B. In addition, the wearable device 104 includes at least one output mode, including but not limited to a visual presentation mode or an audio mode. The wearable device 104 may also include one or more cameras, such as an inward facing camera to view the user's face or body, and an outward facing camera to view the people conversing with the user.

The wearable device 104 is configured to monitor the conversation between participants 102A, 102B, analyze the spoken content, and provide feedback to the wearer (e.g., participant 102A). The feedback may be via a visual or audible feedback and may include suggested topics of conversation, feedback on social cues, or other information regarding the current or past conversations. The feedback is meant to be private (e.g., discrete) to the wearer of the wearable device 104 so as to avoid interrupting the conversation or causing embarrassment to the wearer. The wearable device 104 may interface with another local device (e.g., a mobile phone) or a remote device (e.g., a cloud-based server) to obtain information used for feedback. The interface may be implemented using short-range or long-range protocols over wired or wireless network paths (or combinations thereof). For example, using Bluetooth to bridge a mobile phone with the wearable device 104, and 4G/LTE to communicate between the mobile phone and the cloud server. Alternatively, the wearable device 104 may be self-contained and perform audio processing and feedback determination at the wearable device 104.

As the participants 102A, 102B speak to each other, multiple aspects of the conversation may be monitored to inform the conversation agent, including the attention level of the wearer/user, turn taking behavior of the participants 102A, 102B, or emotional reaction to statements or topics. For example, if the wearer/user is determined to have stopped paying attention, the wearable device 104 may present a summary of the current topic of conversation to allow the wearer/user to "catch up" with the conversation.

In general, a good conversation may be measured by analyzing how much each person in the conversation has spoken. A one-sided conversation is rarely desirable. Thus, in an example, the wearable device 104 is configured to capture audio and determine who is speaking and for how long. The wearable device 104 may then display an indication of how much each person in a conversation has talked. The indication may be provided as a bar chart, percentage value, or some other objective or subjective value. Such an indication may inform the user, for example, that the user should speak less or speak more to achieve better conversational results.

In addition, the audio analysis may be used to identify topics that are discussed. The wearable device 104 may be configured to display or provide which topics have been discussed in the current or previous conversations. Such reminders may be useful to a person with mild dementia or other cognitive impairment.

Results of audio analysis may be stamped with metadata. The metadata may be used to track who participated in a conversation, when the conversation occurred, which topics were discussed, emotional tenor of the conversation, emotional reaction by participants to statements in the conversation, length of the conversation, location of the conversation, etc.

The data gathered via audio analysis may be used for several purposes, such as to present suggested topics to a user, prepare a user for an upcoming conversation, or debrief the user after the conclusion of a conversation. For example, when the system knows the user is about to see a particular person, it may be helpful for the user to rehearse or to remind the user about the particular people anticipated to be involved in the conversation.

Figure 2:
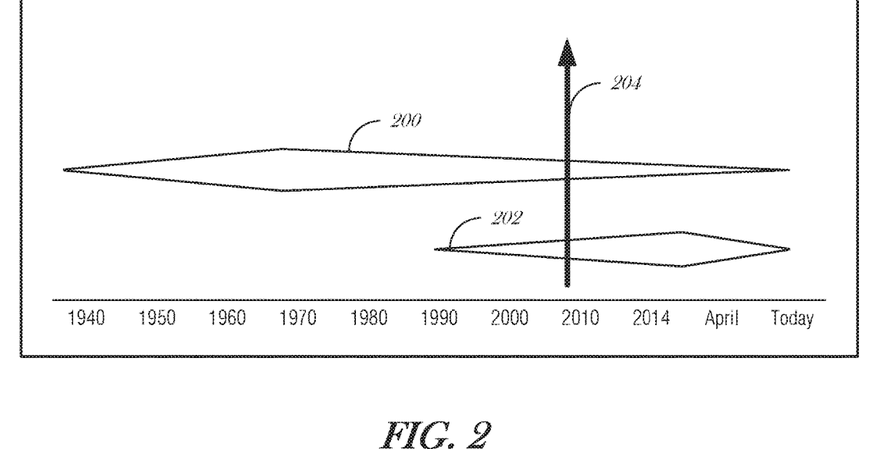
FIG. 2 is a conceptual representation of conversation shapes, according to an embodiment.

FIG. 2 is a conceptual representation of conversation shapes, according to an embodiment. A conversation shape is a domain of conversation topics shaped by a person's characteristics, background, experience, previous conversations, desires, objectives, goals, and the like. Conversation shapes of different people may be used to determine common topics, related topics, or other topics that may be of interest to one or more people in a conversation. FIG. 2 illustrates two conversation shapes 200 and 202. In the example illustrated in FIG. 2, the conversation shapes 200 and 202 are based on age. It is understood that additional factors or dimensions may be used to form a conversation shape. However, to simplify discussion, the conversation shapes 200 and 202 illustrated in FIG. 2 are solely based on age of the participants.

The x-axis represents time and is compressed as it reaches the right side of the graph. Other representations may be used. Conversation shape 200 is of an older person who was born on or around 1940. The configuration of the conversation shape 200 indicates a relative depth of knowledge or understanding of a particular time. For example, when the person associated with conversation shape 200 was about 28 years old, around 1968-1969, the conversation shape 200 is at its widest, indicating that the person has a wide range of possible topics on many historical subjects. As the person grows older, perhaps their career, children, finances, or other aspects of life have become a distraction and the person's attention is more likely to be drawn to recent events that were personally experienced. For example, if the person associated with conversation shape 200 is asked to speak about something of interest that happened in the 80's, she may be more likely to talk about the topic of war than something funny her dog, whereas the opposite may be true if asked to talk about something of interest that happened yesterday.

Similarly, the conversation shape 202, which is associated with a younger person of approximately 30 years of age, has a shape that represents a knowledge pool that peaks relatively recently (approximately early 2014, e.g., February 2014). The conversation shape 202 begins around 1990, when the younger person was approximately 6 years old. This conversation shape 202 represents the younger person's earliest memories.

Conversation shapes 200 and 202 may be configured based on several factors (or dimensions), such as an area of knowledge (e.g., literature, religion, or physics), a person's occupation or background, expertise, psychological stage, or combinations of factors.

The conversation shapes 200 and 202 may be augmented by a set of heuristics that are customized for individuals or pairs or groups of individuals. For example, if the older person has an interest in something current, for example modern jazz, that topic may be a more heavily weighted topic for a conversation with a young person who has some interest in jazz. A topic that a person talks about with others may also gain more weight over time. Thus, salience and recency are two concepts that may be used as factors to determine what someone cares about or considers relevant.

If a younger person has historical interests, then those topics may be weighted more heavily. In general, older people will have stronger interest and recall of events in the distant past than younger people. The system maps these zones of attention and salience, looking for overlap (e.g., recent events or recent events with some association to the distant past). An intersection 204 is illustrated on FIG. 2, which represents one point in time where one or more topics may be identified.

Using a wearable device 104 and conversation shapes 200 and 202, a system is able to provide a user various cues, exercises, alerts, or other information to assist a user to prepare for or conduct a conversation. For example, before a conversation occurs with a specific person or group of people, the user may be prepped with potential conversation topics, keywords, or background information about the specific person or people. During a conversation, the user may be provided topics that are likely interesting to the other person that also map onto the user's own background. Such topics may be identified by using conversation shapes, as discussed above.

Also during a conversation, a user may be alerted as to whether the user or another participant is distracted or not paying attention to the conversation. For example, using an eye-tracking mechanism, an outward facing camera may monitor the eyes of a participant and determine attentiveness. As another example, a wearable device 104 may be equipped with a physiological monitor to determine the attentiveness of the user/wearer. An alert may be provided to the user/wearer to either remind the user/wearer to pay attention or to provide the user/wearer another topic that may be of more interest to the other participant.

After a user/wearer was detected as being inattentive, the wearable device 104 may provide a summary to the user/wearer in order to allow the user "catch up" to the conversation.

Additionally, the wearable device 104 may provide the user/wearer a list of which topics have already been discussed. The list may be provided as a graphical list (e.g., using a glasses-based wearable device 104) or whispered in the user/wearer's ear (e.g., using a headset-based wearable device 104).

The topics may be gleaned from news outlets, public opinion articles, books, or other sources. The topics may be selected based on the time period, the user's own background or interests (e.g., where the person lived at the time period), importance (e.g., a world-wide event versus a local event), and the like. Topics may be ranked and rated according to how likely the topics are to the user and the other participants in the conversation.

During operation, the wearable device 104 monitors various aspects of the conversation environment 100. These aspects include, but are not limited to, current and previous topics discussed, location, time, context of the conversation, presence of other people, and identification or other characteristics of the user or other people present. Based on these inputs and possibly others, the wearable device 104 learns the user's preferences over time. Using machine learning processes, the wearable device 104 may then predict user preferences for various contexts. Various machine learning processes may be used including, but not limited to decision tree learning, association rule learning, artificial neural networks, inductive logic programming, Bayesian networks, and the like.

Figure 3:
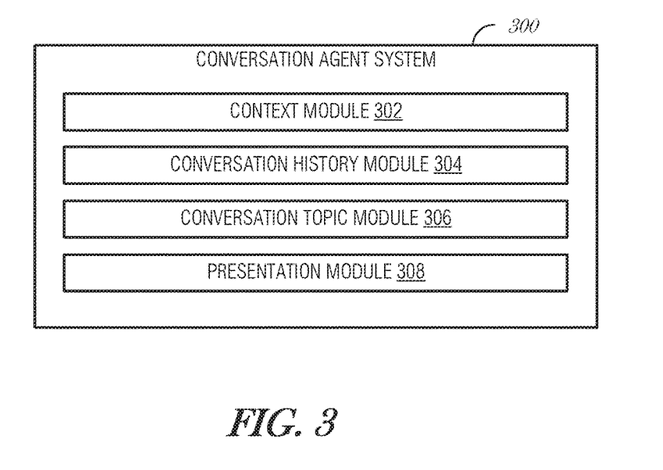
FIG. 3 is a block diagram illustrating a system for a conversation agent, according to an embodiment.

FIG. 3 is a block diagram illustrating a system 300 for a conversation agent, according to an embodiment. The system 300 may be implemented in a wearable device, such as wearable device 104, or may be incorporated into various other forms of devices, such as a laptop, desktop, or the like. Some or all of the processing may be performed local to the user (e.g., in the wearable device 104) or remote from the user (e.g., in a cloud service).

The system 300 includes a context module 302, a conversation history, module 304, a conversation topic module 306, and a presentation module 308.

The context module 302 is configured to determine a context of a conversation involving a first participant and a second participant. The context may include details about the place, time, participants, or topics of conversation. For example, the context module 302 may monitor the user (e.g., first participant) to sense changes in interest level of the conversation or other reactions to topics in the conversation. In an embodiment, to determine the context of the conversation, the context module 302 is to receive sensor information describing a mental, emotional, or physical state of the first participant and determine an interest level of the first participant regarding the conversation. The sensor information may include metrics like heart rate, pupil dilation, breathing patterns, or the like to indicate stress levels, emotional reaction to a statement or topic in the conversation, or attentiveness or inattentiveness. In a further embodiment, the sensor information is obtained from a brain computer interface sensor. A brain computer interface (BCI), sometimes referred to as a mind-machine interface (MMI), direct neural interface (DNI), synthetic telepathy interface (STI), or brain-machine interface (BMI), is a system to monitor and interface with neural activity. Examples of BCIs include invasive and non-invasive models, such as implanted devices, electroencephalography (EEG) (e.g., EEG caps), dry active electrode arrays, magnetoencephalography (MEG), and functional magnetic resonance imaging (fMRI). In an embodiment, the brain computer interface detects alertness of the first participant, the alertness used to derive the interest level of the first participant. Similar monitoring may be performed on the second participant. Thus, in an embodiment, to determine the context of the conversation, the context module 302 is to receive sensor information describing a mental, emotional, or physical state of the second participant and determine an interest level of the second participant regarding the conversation.

In an embodiment, the sensor information is obtained from an image recognition sensor. For example, the image recognition sensor may capture a person's face to determine emotional response to a topic (e.g., disgust or happiness), which may be used to queue the user to change a topic or avoid later discussion on the topic. Other sensors or processes may be used to analyze data, such as facial recognition, eye tracking, or the like. In another embodiment, the image recognition sensor detects gestures of the second participant, the gestures used to derive the interest level of the second participant. Gestures such as crossing a person's arms may indicate a dislike of the other people in the conversation or dislike of a topic. Other gestures such as patting their hand on their knee may indicate impatience or an underlying desire to leave the conversation or change topics.

In an embodiment, the image recognition sensor tracks eye movement of the second participant, the eye movement used to derive the interest level of the second participant. Wandering gaze may indicate that the second participant is no longer interested in participating or no longer interested in the topic.

In an embodiment, the image recognition sensor tracks facial expressions of the second participant, the facial expressions used to derive the interest level of the second participant. Facial expressions may be analyzed to identify disgust, interest, happiness, etc. The second participant's reactions to statements or topics may be used to influence future conversation topics.

In an embodiment, the sensor information is obtained from an audio sensor. The audio sensor may track the conversation topics or statements used in the conversation by way of speech analysis. It may also indicate a participant's emotional response to topics or statements, such as detecting raising a person's voice, which may indicate a higher level of antagonization or stronger feelings about a topic. Thus, in an embodiment, the audio sensor tracks voice characteristics of the second participant, the voice characteristics used to derive the interest level of the second participant.

In an embodiment, the sensor information is obtained from a physiological sensor. In a further embodiment, the physiological sensor tracks heart rate of the first participant, the heart rate used to derive the interest level of the first participant. Other physiological responses may be tracked, such as pupil dilation, skin temperature, breathing patterns, and the like.

Returning to FIG. 3, the conversation history module 304 is to access a conversation history of the first participant and a conversation history of the second participant.

The conversation topic module 306 is to identify a conversation topic using the context of the conversation, the conversation history of the first participant, and the conversation history of the second participant. In an embodiment, the conversation history of the first participant comprises a summary of topics of a previous conversation with the second participant. For example, if the two participants had previously discussed baseball, then a topic for the current conversation may be baseball-related topic.

In an embodiment, the conversation history of the first participant comprises follow up notes provided by the first participant regarding a previous conversation with the second participant. In such an embodiment, the first participant may make notes of a previous conversation on one or more points to follow up on. The first participant may have open questions, or additional comments, or may have been provided an action item to research and provide follow on remarks. In another embodiment, the system may include a wearable microphone and automated speech recognition software to, for example, transcribe conversant utterances into text. Such transcripts may be parsed for further analysis, such as to get keywords to allow topic estimation, among other things.

In an embodiment, to identify the conversation topic, the conversation topic module 306 is to model a conversation shape of the first participant based on the conversation history of the first participant. Then the conversation topic module 306 models a conversation shape of the second participant based on the conversation history of the second participant and identifies an intersection of the conversation shapes of the first and second participants, the intersection corresponding to the conversation topic. In a further embodiment, the conversation topic module 306 is to identify a plurality of potential conversation topics from the intersection of the conversation shapes of the first and second participants and use a heuristic to identify the conversation topic from the plurality of potential conversation topics. In an embodiment, the heuristic is based on at least one of an age of the first or second participant, or a psychological stage of development of the first or second participant.

The presentation module 308 to present the conversation topic to the first participant. In an embodiment, to present the conversation topic, the presentation module 308 is to present a visual indication of the topic. The visual indication may be presented on a worn device (e.g., electronic glasses or a watch), or on a portable personal device (e.g., a tablet), or other device. In various embodiments, the visual indication comprises an image, an icon, or a textual phrase. For example, the topic may be presented using an image of a famous place (e.g., the Eiffel Tower) or an icon of a company (e.g., the Apple® logo).

In an embodiment, to present the conversation topic, the presentation module 308 is to present an audio indication of the topic. In a further embodiment, the audio indication is in a native language of the second participant. The user (first participant) may have an in-ear device that provides the ability to receive an audio cue in a non-disruptive manner.

In a further embodiment, the system 300 includes an alert module to alert the first participant when the interest level of the first participant exceeds a threshold, for example, when the interest level dips below a threshold or rises above a threshold. In an embodiment, the alert comprises an audio cue. The audio cue may be a spoken message (e.g., a simulated voice to remind or suggest a topic to the user). In an embodiment, the audio cue comprises a voice message. Responding, or at least attempting to respond, in a native language may put the participants more at ease and increase the effectiveness of the conversation. Thus, in another embodiment, the voice message is presented to the first participant and is in a native language native of the second participant. In such an embodiment, the voice message may be used as a personal translator. Instead of a voice or audio cue, the alert may be a vibration or other haptic cue. Thus, in an embodiment, the alert comprises a haptic cue.

In an embodiment, the system 300 includes a personal history module to access a personal history of the first participant, and to identify the conversation topic, the conversation topic module 306 is to use the personal history of the first participant. In an embodiment, to identify the conversation topic, the conversation topic module 306 is to identify a situation from the personal history of the first participant that is analogous to the context of the conversation and identify the conversation topic based on the situation.

In another embodiment, the system 300 includes a personal history module to access a personal history of the second participant, and to identify the conversation topic, the conversation topic module 306 is to use the personal history of the second participant. In a further embodiment, to access the personal history of the second participant, the personal history module is to access a social network profile of the second participant. For example, various professional social networks such as LINKED-IN®, personal social networks such as FACEBOOK®, or other networks such as a dating social network may, be accessed to identify likes, dislikes, interests, education or work history, locations where the person has lived or traveled, or the like to identify topics that may be known or of interest to the first or second participants.

In an embodiment, the system 300 is incorporated into a wearable device. In an embodiment, the wearable device is worn by the first participant. In an embodiment, the wearable device is an in-ear device. In another embodiment, the wearable device is a glasses-based device. Other devices are also considered to be within the scope of this disclosure.

Figure 4:
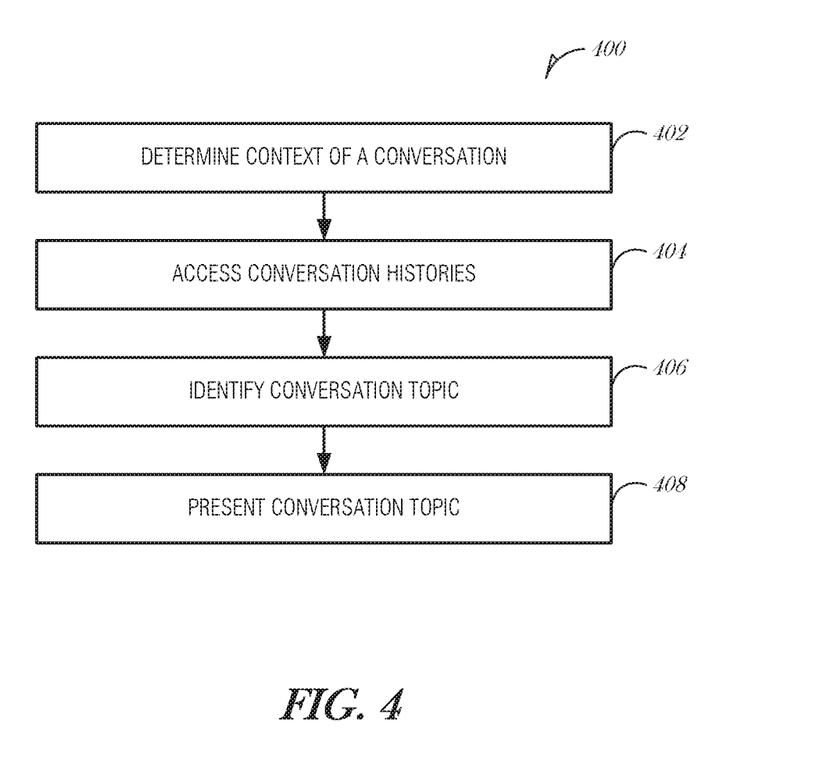
FIG. 4 is a flowchart illustrating a method for implementing a conversation agent on a compute device, according to an embodiment.

FIG. 4 is a flowchart illustrating a method 400 for implementing a conversation agent on a compute device, according to an embodiment. At block 402, a context of a conversation involving a first participant and a second participant is determined. In an embodiment, determining the context of the conversation comprises: receiving sensor information describing a mental, emotional, or physical state of the first participant and determining an interest level of the first participant regarding the conversation. In an embodiment, determining the context of the conversation comprises: receiving sensor information describing a mental, emotional, or physical state of the second participant and determining an interest level of the second participant regarding the conversation. In these embodiments, the sensor information may be obtained from a brain computer interface sensor. In an embodiment, the brain computer interface detects alertness of the first participant, and the alertness is then used to derive the interest level of the first participant.

In another embodiment, the sensor information is obtained from an image recognition sensor. In a further embodiment, the image recognition sensor detects gestures of the second participant, and the gestures are then used to derive the interest level of the second participant. In another embodiment, the image recognition sensor tracks eye movement of the second participant, and the eye movement is used to derive the interest level of the second participant. In another embodiment, the image recognition sensor tracks facial expressions of the second participant, and the facial expressions is then used to derive the interest level of the second participant.

In another embodiment, the sensor information is obtained from an audio sensor. In an embodiment, the audio sensor tracks voice characteristics of the second participant, and the voice characteristics are then used to derive the interest level of the second participant.

In another embodiment, the sensor information is obtained from a physiological sensor. In an embodiment, the physiological sensor tracks heart rate of the first participant, and the heart rate is then used to derive the interest level of the first participant.

At block 404, a conversation history of the first participant and a conversation history of the second participant are accessed. In an embodiment, the conversation history of the first participant comprises a summary of topics of a previous conversation with the second participant. In an embodiment, the conversation history of the first participant comprises follow up notes provided by the first participant regarding a previous conversation. The previous conversation may have been with the second participant.

At block 406, a conversation topic is identified using the context of the conversation, the conversation history of the first participant, and the conversation history of the second participant.

In an embodiment, identifying the conversation topic comprises modeling a conversation shape of the first participant based on the conversation history of the first participant, modeling a conversation shape of the second participant based on the conversation history of the second participant, and identifying an intersection of the conversation shapes of the first and second participants, the intersection corresponding to the conversation topic. In a further embodiment, the method includes identifying a plurality of potential conversation topics from the intersection of the conversation shapes of the first and second participants and using a heuristic to identify the conversation topic from the plurality of potential conversation topics. In an embodiment, the heuristic is based on at least one of an age of the first or second participant, or a psychological stage of development of the first or second participant.

At block 408, the conversation topic is presented to the first participant. In an embodiment, presenting the conversation topic comprises presenting a visual indication of the topic. In embodiments, the visual indication comprises an image, an icon, or a textual phrase. In an embodiment, presenting the conversation topic comprises presenting an audio indication of the topic. In an embodiment, the audio indication is in a native language of the second participant.

In a further embodiment, the method 400 includes alerting the first participant when the interest level of the first participant exceeds a threshold.

In an embodiment, the alert comprises an audio cue. In an embodiment, the audio cue comprises a voice message. In an embodiment, the voice message is presented to the first participant and is in a native language native of the second participant. In another embodiment, the alert comprises a haptic cue.

In an embodiment, the method 400 includes accessing a personal history of the first participant, where identifying the conversation topic includes using the personal history of the first participant. In a further embodiment, identifying the conversation topic comprises identifying a situation from the personal history of the first participant that is analogous to the context of the conversation and identifying the conversation topic based on the situation.

In an embodiment, the method 400 includes accessing a personal history of the second participant, and wherein identifying the conversation topic comprises using the personal history of the second participant. In a further embodiment, accessing the personal history of the second participant comprises accessing a social network profile of the second participant.

In an embodiment, the compute device is a wearable device. In an embodiment, the wearable device is worn by the first participant. In an embodiment, the wearable device is an in-ear device. In an embodiment, the wearable device is a glasses-based device. In another embodiment the compute device is a table-top computer having at least a camera and microphone to allow the device to obtain identities of the individuals and content of the conversation. Such as system may have at least a speaker to play suggested topics to the people nearby.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
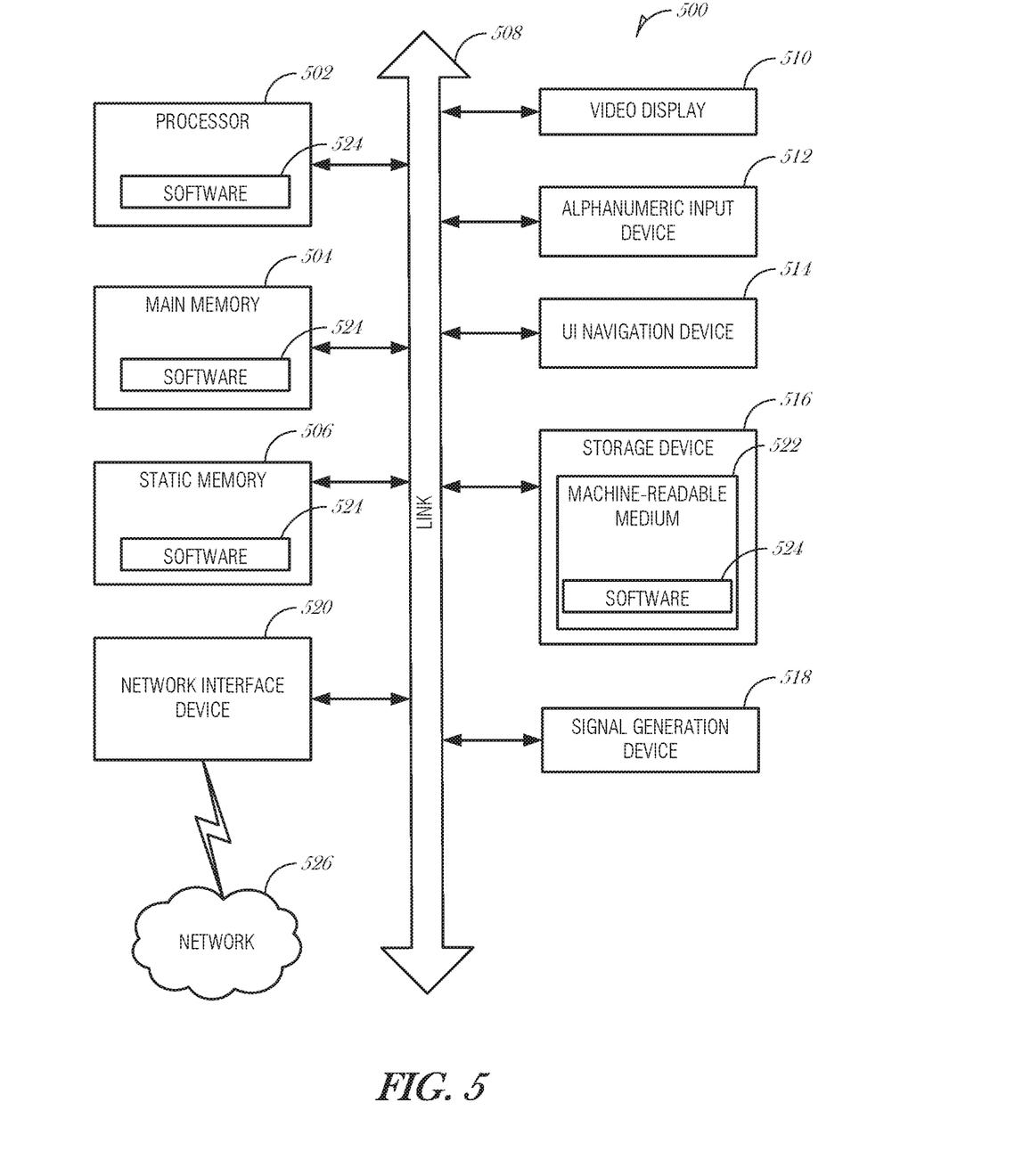
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 includes subject matter for a conversation agent system (such as a device, apparatus, or machine) comprising: a context module to determine a context of a conversation involving a first participant and a second participant; a conversation history module to access a conversation history of the first participant and a conversation history of the second participant; a conversation topic module to identify a conversation topic using the context of the conversation, the conversation history of the first participant, and the conversation history of the second participant; and a presentation module to present the conversation topic to the first participant.

In Example 2, the subject matter of Example 1 may include, wherein to determine the context of the conversation, the context module is to: receive sensor information describing a mental, emotional, or physical state of the first participant; and determine an interest level of the first participant regarding the conversation.

In Example 3, the subject matter of any one of Examples 1 to 2 may include, wherein to determine the context of the conversation, the context module is to: receive sensor information describing a mental, emotional, or physical state of the second participant; and determine an interest level of the second participant regarding the conversation.

In Example 4, the subject matter of any one of Examples 1 to 3 may include, wherein the sensor information is obtained from a brain computer interface sensor.

In Example 5, the subject matter of any one of Examples 1 to 4 may include, wherein the brain computer interface detects alertness of the first participant, the alertness used to derive the interest level of the first participant.

In Example 6, the subject matter of any one of Examples 1 to 5 may include, wherein the sensor information is obtained from an image recognition sensor.

In Example 7, the subject matter of any one of Examples 1 to 6 may include, wherein the image recognition sensor detects gestures of the second participant, the gestures used to derive the interest level of the second participant.

In Example 8, the subject matter of any one of Examples 1 to 7 may include, wherein the image recognition sensor tracks eye movement of the second participant, the eye movement used to derive the interest level of the second participant.

In Example 9, the subject matter of any one of Examples 1 to 8 may include, wherein the image recognition sensor tracks facial expressions of the second participant, the facial expressions used to derive the interest level of the second participant.

In Example 10, the subject matter of any one of Examples 1 to 9 may include, wherein the sensor information is obtained from an audio sensor.

In Example 11, the subject matter of any one of Examples 1 to 10 may include, wherein the audio sensor tracks voice characteristics of the second participant, the voice characteristics used to derive the interest level of the second participant.

In Example 12, the subject matter of any one of Examples 1 to 11 may include, wherein the sensor information is obtained from a physiological sensor.

In Example 13, the subject matter of any one of Examples 1 to 12 may include, wherein the physiological sensor tracks heart rate of the first participant, the heart rate used to derive the interest level of the first participant.

In Example 14, the subject matter of any one of Examples 1 to 13 may include, further comprising: an alert module to alert the first participant when the interest level of the first participant exceeds a threshold.

In Example 15, the subject matter of any one of Examples 1 to 14 may include, wherein the alert comprises an audio cue.

In Example 16, the subject matter of any one of Examples 1 to 15 may include, wherein the audio cue comprises a voice message.

In Example 17, the subject matter of any one of Examples 1 to 16 may, include, wherein the voice message is presented to the first participant and is in a native language native of the second participant.

In Example 18, the subject matter of any one of Examples 1 to 17 may, include, wherein the alert comprises a haptic cue.

In Example 19, the subject matter of any one of Examples 1 to 18 may include, wherein the conversation history of the first participant comprises a summary of topics of a previous conversation with the second participant.

In Example 20, the subject matter of any one of Examples 1 to 19 may, include, wherein the conversation history of the first participant comprises follow up notes provided by the first participant regarding a previous conversation with the second participant.

In Example 21, the subject matter of any one of Examples 1 to 20 may include, wherein to identify the conversation topic, the conversation topic module is to: model a conversation shape of the first participant based on the conversation history of the first participant; model a conversation shape of the second participant based on the conversation history of the second participant; and identify an intersection of the conversation shapes of the first and second participants, the intersection corresponding to the conversation topic.

In Example 22, the subject matter of any one of Examples 1 to 21 may include, wherein the conversation topic module is to: identify a plurality of potential conversation topics from the intersection of the conversation shapes of the first and second participants; and use a heuristic to identify the conversation topic from the plurality of potential conversation topics.

In Example 23, the subject matter of any one of Examples 1 to 22 may include, wherein the heuristic is based on at least one of an age of the first or second participant, or a psychological stage of development of the first or second participant.

In Example 24, the subject matter of any one of Examples 1 to 23 may include, further comprising a personal history module to access a personal history of the first participant, wherein to identify the conversation topic, the conversation topic module is to use the personal history of the first participant.

In Example 25, the subject matter of any one of Examples 1 to 24 may, include, wherein to identify the conversation topic, the conversation topic module is to: identify a situation from the personal history of the first participant that is analogous to the context of the conversation; and identify the conversation topic based on the situation.

In Example 26, the subject matter of any one of Examples 1 to 25 may, include, further comprising a personal history module to access a personal history of the second participant, wherein to identify the conversation topic, the conversation topic module is to use the personal history of the second participant.

In Example 27, the subject matter of any one of Examples 1 to 26 may, include, wherein to access the personal history of the second participant, the personal history module is to access a social network profile of the second participant.

In Example 28, the subject matter of any one of Examples 1 to 27 may, include, wherein to present the conversation topic, the presentation module is to present a visual indication of the topic.

In Example 29, the subject matter of any one of Examples 1 to 28 may include, wherein the visual indication comprises an image, an icon, or a textual phrase.

In Example 30, the subject matter of any one of Examples 1 to 29 may include, wherein to present the conversation topic, the presentation module is to present an audio indication of the topic.

In Example 31, the subject matter of any one of Examples 1 to 30 may, include, wherein the audio indication is in a native language of the second participant.

In Example 32, the subject matter of any one of Examples 1 to 31 may include, wherein the system is incorporated into a wearable device.

In Example 33, the subject matter of any one of Examples 1 to 32 may include, wherein the wearable device is worn by the first participant.

In Example 34, the subject matter of any one of Examples 1 to 33 may include, wherein the wearable device is an in-ear device.

In Example 35, the subject matter of any one of Examples 1 to 34 may include, wherein the wearable device is a glasses-based device.

Example 36 includes subject matter for implementing a conversation agent on a compute device (such as a method, means for performing acts, machine readable medium including instructions that when performed by a machine cause the machine to performs acts, or an apparatus to perform) comprising: determining a context of a conversation involving a first participant and a second participant; accessing a conversation history of the first participant and a conversation history of the second participant; identifying a conversation topic using the context of the conversation, the conversation history of the first participant, and the conversation history of the second participant; and presenting the conversation topic to the first participant.

In Example 37, the subject matter of Example 36 may include, wherein determining the context of the conversation comprises: receiving sensor information describing a mental, emotional, or physical state of the first participant; and determining an interest level of the first participant regarding the conversation.

In Example 38, the subject matter of any one of Examples 36 to 37 may include, wherein determining the context of the conversation comprises: receiving sensor information describing a mental, emotional, or physical state of the second participant; and determining an interest level of the second participant regarding the conversation.

In Example 39, the subject matter of any one of Examples 36 to 38 may include, wherein the sensor information is obtained from a brain computer interface sensor.

In Example 40, the subject matter of any one of Examples 36 to 39 may include, wherein the brain computer interface detects alertness of the first participant, the alertness used to derive the interest level of the first participant.

In Example 41, the subject matter of any one of Examples 36 to 40 may include, wherein the sensor information is obtained from an image recognition sensor.

In Example 42, the subject matter of any one of Examples 36 to 41 may include, wherein the image recognition sensor detects gestures of the second participant, the gestures used to derive the interest level of the second participant.

In Example 43, the subject matter of any one of Examples 36 to 42 may include, wherein the image recognition sensor tracks eye movement of the second participant, the eye movement used to derive the interest level of the second participant.

In Example 44, the subject matter of any one of Examples 36 to 43 may include, wherein the image recognition sensor tracks facial expressions of the second participant, the facial expressions used to derive the interest level of the second participant.

In Example 45, the subject matter of any one of Examples 36 to 44 may include, wherein the sensor information is obtained from an audio sensor.

In Example 46, the subject matter of any one of Examples 36 to 45 may include, wherein the audio sensor tracks voice characteristics of the second participant, the voice characteristics used to derive the interest level of the second participant.

In Example 47, the subject matter of any one of Examples 36 to 46 may include, wherein the sensor information is obtained from a physiological sensor.

In Example 48, the subject matter of any one of Examples 36 to 47 may include, wherein the physiological sensor tracks heart rate of the first participant, the heart rate used to derive the interest level of the first participant.

In Example 49, the subject matter of any one of Examples 36 to 48 may include, further comprising: alerting the first participant when the interest level of the first participant exceeds a threshold.

In Example 50, the subject matter of any one of Examples 36 to 49 may include, wherein the alert comprises an audio cue.

In Example 51, the subject matter of any one of Examples 36 to 50 may include, wherein the audio cue comprises a voice message.

In Example 52, the subject matter of any one of Examples 36 to 51 may include, wherein the voice message is presented to the first participant and is in a native language native of the second participant.

In Example 53, the subject matter of any one of Examples 36 to 52 may include, wherein the alert comprises a haptic cue.

In Example 54, the subject matter of any one of Examples 36 to 53 may include, wherein the conversation history of the first participant comprises a summary of topics of a previous conversation with the second participant.

In Example 55, the subject matter of any one of Examples 36 to 54 may include, wherein the conversation history of the first participant comprises follow up notes provided by the first participant regarding a previous conversation with the second participant.

In Example 56, the subject matter of any one of Examples 36 to 55 may include, wherein identifying the conversation topic comprises: modeling a conversation shape of the first participant based on the conversation history of the first participant; modeling a conversation shape of the second participant based on the conversation history of the second participant; and identifying an intersection of the conversation shapes of the first and second participants, the intersection corresponding to the conversation topic.

In Example 57, the subject matter of any one of Examples 36 to 56 may include, further comprising: identifying a plurality of potential conversation topics from the intersection of the conversation shapes of the first and second participants; and using a heuristic to identify the conversation topic from the plurality of potential conversation topics.

In Example 58, the subject matter of any one of Examples 36 to 57 may include, wherein the heuristic is based on at least one of an age of the first or second participant, or a psychological stage of development of the first or second participant.

In Example 59, the subject matter of any one of Examples 36 to 58 may include, further comprising accessing a personal history of the first participant, and wherein identifying the conversation topic includes using the personal history of the first participant.

In Example 60, the subject matter of any one of Examples 36 to 59 may include, wherein identifying the conversation topic comprises: identifying a situation from the personal history of the first participant that is analogous to the context of the conversation; and identifying the conversation topic based on the situation.

In Example 61, the subject matter of any one of Examples 36 to 60 may include, further comprising accessing a personal history of the second participant, and wherein identifying the conversation topic comprises using the personal history of the second participant.

In Example 62, the subject matter of any one of Examples 36 to 61 may include, wherein accessing the personal history of the second participant comprises accessing a social network profile of the second participant.

In Example 63, the subject matter of any one of Examples 36 to 62 may include, wherein presenting the conversation topic comprises presenting a visual indication of the topic.

In Example 64, the subject matter of any one of Examples 36 to 63 may include, wherein the visual indication comprises an image, an icon, or a textual phrase.

In Example 65, the subject matter of any one of Examples 36 to 64 may include, wherein presenting the conversation topic comprises presenting an audio indication of the topic.

In Example 66, the subject matter of any one of Examples 36 to 65 may include, wherein the audio indication is in a native language of the second participant.

In Example 67, the subject matter of any one of Examples 36 to 66 may include, wherein the compute device is a wearable device.

In Example 68, the subject matter of any one of Examples 36 to 67 may include, wherein the wearable device is worn by the first participant.

In Example 69, the subject matter of any one of Examples 36 to 68 may include, wherein the wearable device is an in-ear device.

In Example 70, the subject matter of any one of Examples 36 to 69 may include, wherein the wearable device is a glasses-based device.

Example 71 includes at least one machine-readable medium including instructions, which when executed by a machine, cause the machine to perform operations of any of the Examples 36-70.

Example 72 includes an apparatus comprising means for performing any of the Examples 36-70.

Example 73 includes subject matter for implementing a conversation agent on a compute device (such as a device, apparatus, or machine) comprising: means for determining a context of a conversation involving a first participant and a second participant; means for accessing a conversation history of the first participant and a conversation history of the second participant; means for identifying a conversation topic using the context of the conversation, the conversation history of the first participant, and the conversation history of the second participant; and means for presenting the conversation topic to the first participant.

In Example 74, the subject matter of Example 73 may include, wherein the means for determining the context of the conversation comprises: means for receiving sensor information describing a mental, emotional, or physical state of the first participant; and means for determining an interest level of the first participant regarding the conversation.

In Example 75, the subject matter of any one of Examples 73 to 74 may include, wherein the means for determining the context of the conversation comprises: means for receiving sensor information describing a mental, emotional, or physical state of the second participant; and means for determining an interest level of the second participant regarding the conversation.

In Example 76, the subject matter of any one of Examples 73 to 75 may include, wherein the sensor information is obtained from a brain computer interface sensor.

In Example 77, the subject matter of any one of Examples 73 to 76 may include, wherein the brain computer interface detects alertness of the first participant, the alertness used to derive the interest level of the first participant.

In Example 78, the subject matter of any one of Examples 73 to 77 may include, wherein the sensor information is obtained from an image recognition sensor.

In Example 79, the subject matter of any one of Examples 73 to 78 may include, wherein the image recognition sensor detects gestures of the second participant, the gestures used to derive the interest level of the second participant.

In Example 80, the subject matter of any one of Examples 73 to 79 may include, wherein the image recognition sensor tracks eye movement of the second participant, the eye movement used to derive the interest level of the second participant.

In Example 81, the subject matter of any one of Examples 73 to 80 may include, wherein the image recognition sensor tracks facial expressions of the second participant, the facial expressions used to derive the interest level of the second participant.

In Example 82, the subject matter of any one of Examples 73 to 81 may include, wherein the sensor information is obtained from an audio sensor.

In Example 83, the subject matter of any one of Examples 73 to 82 may include, wherein the audio sensor tracks voice characteristics of the second participant, the voice characteristics used to derive the interest level of the second participant.

In Example 84, the subject matter of any one of Examples 73 to 83 may include, wherein the sensor information is obtained from a physiological sensor.

In Example 85, the subject matter of any one of Examples 73 to 84 may include, wherein the physiological sensor tracks heart rate of the first participant, the heart rate used to derive the interest level of the first participant.

In Example 86, the subject matter of any one of Examples 73 to 85 may include, further comprising: means for alerting the first participant when the interest level of the first participant exceeds a threshold.

In Example 87, the subject matter of any one of Examples 73 to 86 may include, wherein the alert comprises an audio cue.

In Example 88, the subject matter of any one of Examples 73 to 87 may include, wherein the audio cue comprises a voice message.

In Example 89, the subject matter of any one of Examples 73 to 88 may include, wherein the voice message is presented to the first participant and is in a native language native of the second participant.

In Example 90, the subject matter of any one of Examples 73 to 89 may include, wherein the alert comprises a haptic cue.

In Example 91, the subject matter of any one of Examples 73 to 90 may include, wherein the conversation history of the first participant comprises a summary of topics of a previous conversation with the second participant.

In Example 92, the subject matter of any one of Examples 73 to 91 may include, wherein the conversation history of the first participant comprises follow up notes provided by the first participant regarding a previous conversation with the second participant.

In Example 93, the subject matter of any one of Examples 73 to 92 may include, wherein the means for identifying the conversation topic comprises: means for modeling a conversation shape of the first participant based on the conversation history of the first participant; means for modeling a conversation shape of the second participant based on the conversation history of the second participant; and means for identifying an intersection of the conversation shapes of the first and second participants, the intersection corresponding to the conversation topic.

In Example 94, the subject matter of any one of Examples 73 to 93 may include, further comprising: means for identifying a plurality of potential conversation topics from the intersection of the conversation shapes of the first and second participants; and means for using a heuristic to identify the conversation topic from the plurality of potential conversation topics.

In Example 95, the subject matter of any one of Examples 73 to 94 may include, wherein the heuristic is based on at least one of an age of the first or second participant, or a psychological stage of development of the first or second participant.

In Example 96, the subject matter of any one of Examples 73 to 95 may include, further comprising means for accessing a personal history of the first participant, and wherein the means for identifying the conversation topic includes means for using the personal history of the first participant.

In Example 97, the subject matter of any one of Examples 73 to 96 may include, wherein the means for identifying the conversation topic comprises: means for identifying a situation from the personal history of the first participant that is analogous to the context of the conversation; and means for identifying the conversation topic based on the situation.

In Example 98, the subject matter of any one of Examples 73 to 97 may include, further comprising means for accessing a personal history of the second participant, and wherein identifying the conversation topic comprises using the personal history of the second participant.

In Example 99, the subject matter of any one of Examples 73 to 98 may include, wherein the means for accessing the personal history of the second participant comprises means for accessing a social network profile of the second participant.

In Example 100, the subject matter of any one of Examples 73 to 99 may include, wherein the means for presenting the conversation topic comprises presenting a visual indication of the topic.

In Example 101, the subject matter of any one of Examples 73 to 100 may include, wherein the visual indication comprises an image, an icon, or a textual phrase.

In Example 102, the subject matter of any one of Examples 73 to 101 may include, wherein presenting the conversation topic comprises presenting an audio indication of the topic.

In Example 103, the subject matter of any one of Examples 73 to 102 may include, wherein the audio indication is in a native language of the second participant.

In Example 104, the subject matter of any one of Examples 73 to 103 may include, wherein the compute device is a wearable device.

In Example 105, the subject matter of any one of Examples 73 to 104 may include, wherein the wearable device is worn by the first participant.

In Example 106, the subject matter of any one of Examples 73 to 105 may include, wherein the wearable device is an in-ear device.

In Example 107, the subject matter of any one of Examples 73 to 106 may include, wherein the wearable device is a glasses-based device.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above, description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for a conversation agent, the system comprising:
   a processor; and
   a machine-readable medium including instructions, which when executed by the processor, cause the processor to implement the operations comprising:
      monitoring a conversation between the first participant and the second participant;
      determining that the first participant was inattentive during a portion of the conversation; and
      providing feedback to the first participant in the form of a plurality of alternative conversation topics that are ranked according to their relevance to the first and second participants based on a first and second conversation shape of the respective first and second participants, the conversation shapes representing knowledge and experience of the respective first and second participants, wherein the relevance of the plurality of alternative conversation topics identified are based on an overlap of the first and second conversation shapes, and wherein the feedback is provided as an audible notification.

2. The system of claim 1, wherein the machine-readable medium includes instructions to perform the operations comprising:
   generating a summary of the conversation; and
   providing the summary to the first participant in response to determining that the first participant was inattentive.

3. The system of claim 1, wherein the machine-readable medium includes instructions to perform the operations comprising:
   generating a list of topics discussed during the conversation; and
   providing the list of topics to the first participant.

4. The system of claim 1, wherein the system is incorporated into a wearable device.

5. The system of claim 4, wherein the wearable device is worn by the first participant.

6. The system of claim 4, wherein the wearable device is an in-ear device.

7. The system of claim 4, wherein the wearable device is a glasses-based device.

8. The system of claim 7, wherein the wearable device includes a camera to determine whether the first participant was inattentive.

9. A method for a conversation agent, the method comprising:
   monitoring, using a processor-based device, a conversation between the first participant and the second participant;
   determining that the first participant was inattentive during a portion of the conversation; and
   providing feedback to the first participant in the form of a plurality of alternative conversation topics that are ranked according to their relevance to the first and second participants based on a first and second conversation shape of the respective first and second participants, the conversation shapes representing knowledge and experience of the respective first and second participants, wherein the relevance of the plurality of alternative conversation topics identified are based on an overlap of the first and second conversation shapes, and wherein the feedback is provided as an audible notification.

10. The method of claim 9, comprising:
generating a summary of the conversation; and
providing the summary to the first participant in response to determining that the first participant was inattentive.

11. The method of claim 9, comprising:
generating a list of topics discussed during the conversation; and
providing the list of topics to the first participant.

12. The method of claim 9, wherein the processor-based device is incorporated into a wearable device.

13. The method of claim 12, wherein the wearable device is worn by the first participant.

14. The method of claim 12, wherein the wearable device is an in-ear device.

15. The method of claim 12, wherein the wearable device is a glasses-based device.

16. The method of claim 15, wherein the wearable device includes a camera to determine whether the first participant was inattentive.

* * * * *